United States Patent
Pieron et al.

(10) Patent No.: US 9,675,891 B2
(45) Date of Patent: *Jun. 13, 2017

(54) SYSTEM AND METHOD FOR GRANTING IN-GAME BONUSES TO A USER

(71) Applicant: KABAM, INC., San Francisco, CA (US)

(72) Inventors: Luc Pieron, San Francisco, CA (US); Thomas Baxter, Millbrae, CA (US); Henry Rull, Concord, CA (US)

(73) Assignee: Aftershock Services, Inc., San Francisco, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 14/265,345

(22) Filed: Apr. 29, 2014

(65) Prior Publication Data

US 2015/0306494 A1    Oct. 29, 2015

(51) Int. Cl.
    A63F 9/24      (2006.01)
    A63F 13/00     (2014.01)
    G06F 17/00     (2006.01)
    G06F 19/00     (2011.01)
    A63F 13/822    (2014.01)
    A63F 13/69     (2014.01)

(52) U.S. Cl.
    CPC ............ *A63F 13/822* (2014.09); *A63F 13/69* (2014.09)

(58) Field of Classification Search
    CPC ........................................................ G07F 17/32
    USPC ..................................................... 463/31, 42
    See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,306,033 B1 | 10/2001 | Niwa et al. .................... 463/31 |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |

(Continued)

FOREIGN PATENT DOCUMENTS

| | | |
|---|---|---|
| KR | 1020130137431 | 12/2013 |
| WO | 0226333 | 1/2002 |

(Continued)

OTHER PUBLICATIONS

MapleStory—Guides—Equipment Upgrading 101: Scrolls, URL: maplestory.nexon.net/guides/game-play/systems/OOFFV/#mitigating [Retrieved Jun. 24, 2013].

(Continued)

*Primary Examiner* — Kevin Y Kim

(74) *Attorney, Agent, or Firm* — Sheppard Mullin Richter & Hampton LLP

(57) ABSTRACT

Disclosed herein is technology for providing in-game bonuses to a user's in-game persona. The technology involves affiliation virtual items that provide quality-based bonuses and level based bonuses. The technology provides systems and methods for upgrading an affiliation virtual item's level and/or enhancing the affiliation virtual item's quality. If an upgrade or enhancement is unsuccessful, the affiliation virtual item may be broken and the quality bonuses and/or level bonuses may be decreased until the item is repaired.

20 Claims, 8 Drawing Sheets

(56) References Cited

U.S. PATENT DOCUMENTS

| | | |
|---|---|---|
| 6,811,483 B1 | 11/2004 | Webb |
| 6,850,900 B1 | 2/2005 | Hare |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,157,635 B2 | 4/2012 | Hardy |
| 8,187,101 B2 | 5/2012 | Herrmann |
| 8,226,472 B2 | 7/2012 | Van Luchene |
| 8,239,487 B1 | 8/2012 | Hoffman |
| 8,272,956 B2 | 9/2012 | Kelly |
| 8,282,491 B2 | 10/2012 | Auterio |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,601 B1 | 11/2012 | Luciano, Jr. |
| 8,332,260 B1 | 12/2012 | Mysen |
| 8,348,716 B2 | 1/2013 | Ganz |
| 8,348,767 B2 | 1/2013 | Mahajan |
| 8,360,858 B2 | 1/2013 | LaRocca |
| 8,360,867 B2 | 1/2013 | VanLuchene |
| 8,366,544 B2 | 2/2013 | Walker |
| 8,371,925 B2 | 2/2013 | Bonney |
| 8,376,826 B2 | 2/2013 | Katz |
| 8,401,913 B2 | 3/2013 | Alivandi |
| 8,439,759 B1 | 5/2013 | Mello |
| 8,512,150 B2 | 8/2013 | Herrmann |
| 8,636,591 B1 | 1/2014 | Hawk |
| 8,777,754 B1 | 7/2014 | Santini |
| 8,790,185 B1 | 7/2014 | Caldarone |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 2002/0059397 A1 | 5/2002 | Feola |
| 2002/0072412 A1 | 6/2002 | Young |
| 2002/0095327 A1 | 7/2002 | Zumel |
| 2002/0165794 A1 | 11/2002 | Ishihara |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0216167 A1 | 11/2003 | Gauselmann |
| 2004/0002387 A1 | 1/2004 | Grady |
| 2004/0068451 A1 | 4/2004 | Lenk |
| 2004/0215524 A1 | 10/2004 | Parkyn |
| 2004/0224745 A1 | 11/2004 | Bregenzer |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0287029 A1 | 12/2006 | Yoshinobu |
| 2007/0077988 A1 | 4/2007 | Friedman |
| 2007/0129139 A1 | 6/2007 | Nguyen |
| 2007/0281285 A1 | 12/2007 | Jayaweera |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0194318 A1 | 8/2008 | Kralicky |
| 2008/0207306 A1 | 8/2008 | Higbie ............................ 463/23 |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2010/0035689 A1 | 2/2010 | Altshuler |
| 2010/0041472 A1 | 2/2010 | Gagner |
| 2010/0050088 A1 | 2/2010 | Neustaedter |
| 2010/0094841 A1 | 4/2010 | Bardwil |
| 2010/0174593 A1 | 7/2010 | Cao |
| 2010/0198653 A1 | 8/2010 | Bromenshenkel |
| 2010/0227675 A1 | 9/2010 | Luxton |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2011/0092271 A1 | 4/2011 | Nguyen |
| 2011/0092273 A1 | 4/2011 | Cerbini |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0256921 A1 | 10/2011 | Pacey |
| 2011/0263324 A1 | 10/2011 | Ganetakos et al. ............. 463/31 |
| 2011/0275438 A9 | 11/2011 | Hardy |
| 2011/0281638 A1 | 11/2011 | Bansi |
| 2011/0282764 A1 | 11/2011 | Borst |
| 2011/0300923 A1 | 12/2011 | Van Luchene |
| 2011/0319152 A1 | 12/2011 | Ross |
| 2012/0011002 A1 | 1/2012 | Crowe |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0157193 A1 | 6/2012 | Arezina |
| 2012/0166380 A1 | 6/2012 | Sridharan |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0231891 A1 | 9/2012 | Watkins |
| 2012/0244945 A1 | 9/2012 | Kolo |
| 2012/0244950 A1 | 9/2012 | Braun |
| 2012/0245988 A1 | 9/2012 | Pace |

(56) References Cited

U.S. PATENT DOCUMENTS

| | | |
|---|---|---|
| 2012/0289315 A1 | 11/2012 | Van Luchene |
| 2012/0289330 A1 | 11/2012 | Leydon |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | vanOs |
| 2013/0005437 A1 | 1/2013 | Bethke |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006736 A1 | 1/2013 | Bethke |
| 2013/0012304 A1 | 1/2013 | Cartwright |
| 2013/0013459 A1 | 1/2013 | Kerr |
| 2013/0072278 A1 | 3/2013 | Salazar |
| 2013/0079087 A1 | 3/2013 | Brosnan |
| 2013/0090173 A1 | 4/2013 | Kislyi |
| 2013/0095914 A1 | 4/2013 | Allen |
| 2013/0124361 A1 | 5/2013 | Bryson |
| 2013/0173393 A1 | 7/2013 | Calman |
| 2013/0210511 A1 | 8/2013 | LaRocca |
| 2013/0217489 A1 | 8/2013 | Bendayan |
| 2013/0226733 A1 | 8/2013 | Evans |
| 2013/0244767 A1 | 9/2013 | Barclay |
| 2013/0288757 A1 | 10/2013 | Guthridge |
| 2013/0290147 A1 | 10/2013 | Chandra |
| 2013/0303726 A1 | 11/2013 | Mozzarelli |
| 2013/0310164 A1 | 11/2013 | Walker |
| 2014/0004884 A1 | 1/2014 | Chang |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0329585 A1 | 11/2014 | Santini |
| 2014/0337259 A1 | 11/2014 | Lamb |
| 2015/0019349 A1 | 1/2015 | Milley |
| 2015/0031440 A1 | 1/2015 | Desanti |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

MapleStory—Guides—Equipment Upgrading 101: Enhancements, URL: maplestory.nexon.net/guides/game-play/systems/OOFlk [Retrieved Jun. 24, 2013].

MapleStory—Guides—Equipment Upgrading 101: Potentials, URL: maplestory.nexon.net/guides/game-play/systems/OOFlj/ [Retrieved Jun. 24, 2013].

Dreamslayer's Enchanting and Upgrading Guide—With Pictures:D and Explanations, URL: forums.elswordonline.com/Topic5673. aspx [Retrieved Feb. 21, 2013].

The Arreat Summit—Items: Basic Item Information, URL: web.archive.org/web/20090323171356/http://classic.battle.net/diablo2exp/items/basics.shtml [Retrieved Feb. 21, 2013].

Elsword—Wikepedia, the free encyclopedia, URL: en.wikipedia.org/wiki/Elsword [Retrieved Feb. 21, 2013].

Diablo II, Blizzard Entertainment, Mar. 23, 2009, manual and online website http://web.archive.org/web/20090323171356/http://classic.battle.net/diablo2exp/items/basics.shtml.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013].

Gem System—Street Fighter X Tekken, URL: http://www.streetfighter.com/us/sfxtk/features/gem-system [Retrieved Nov. 6, 2012].

Profession —WoWWiki—Your guide to the World of Warcraft, URL: http://www.wowwiki.com/Profession [Retrieved Nov. 6, 2012].

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

'Quest item—WoWWiki—Your guide to the World of Warcraft', printed from http://www.wowwiki.com/Quest_Item, Retrieved on Apr. 16, 2014, 1 page.

"Cataclysm Guide: Guild Advancement—Wowhead", http://www.wowhead.com/guide=cataclysm&guilds, printed Dec. 5, 2013, 4 pages.

"Guild Housing System—FlyFF Wiki", http://flyff-wiki.gpotato.com/wiki/Guild_Housing_System, printed Dec. 5, 2013, 5 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

Super Mario Bros. 3, NES Gameplay, http://www.youtube.com/watch?v=82TL-Acm4ts, 1 page.

Super Mario Bros. 3, StrategyWiki, the video game walkthrough and strategy guide, http://strategywiki.org/wiki/Super_Mario_Bros._3, 4 pages.

Super Mario Bros. 3 Review, Nintendo for NES, Feb. 1990, pp. 1-4.

TFF Challenge—UC Davis, http://tffchallenge.com/team/uc-davis/, printed Jan. 15, 2014, 12 pages.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

(56) References Cited

OTHER PUBLICATIONS

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php ?title=Getting_ Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store &oldid=396550>,<http://lotrowiki.com/index.php?title=Ouest:A_Little_Extra_Never_Hurts_--_Part_1_&oldid=399597> (28 pgs).

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

Path of Exile, Internet posting: http://web.archive.org/web/20120606004658/http://www.pathofexile.com/forum/view-thread/12056, Nov. 16, 2011, 52 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Wikipedia, Mafia Wars, <http://en.wikipedia.org/wiki/Mafia_Wars>, Jan. 28, 2012, 3 pages.

New Feature: Tiered Tournaments and Tournament Updates, printed from http://community.kabam.com/forums/showthread.php?171349-New-Feat on Feb. 11, 2014, 2 pages.

SYSTEM AND METHOD FOR GRANTING IN-GAME BONUSES TO A USER

FIELD

The disclosure relates to video games and more specifically, a way of providing in-game bonuses to a user.

BACKGROUND

Many video games involve a user controlling an on-screen persona. Examples are a character (e.g., Mario in Super Mario Bros. by NINTENDO), a vehicle (e.g., a ship in Galaga by MIDWAY GAMES Inc.), a realm (e.g., a city such as in SimCity by MAXIS, or a military group (e.g., Terrans in StarCraft by BLIZZARD ENTERTAINMENT). Many of these games provide a way for the persona to obtain a bonus to make the persona more powerful or the game easier to play, e.g., through power ups or virtual items, or by developing certain technologies as part of the gameplay.

SUMMARY

Described herein is technology for providing bonuses to members of an affiliation, such that a user's in-game persona is provided with one or more bonuses based on their association with one or more game affiliations. The bonuses may be awarded to affiliations and may be based on an in-game virtual item that may have both quality-based bonuses and level-based bonuses. The virtual item may provide one or more benefits to the users, wherein the quality-based bonuses and the level-based bonuses may provide benefits proportional to the level and/or amount of the bonus. In some implementations, the bonus conferred may be weighted based on which slot in an interface, configured to facilitate upgrading/downgrading of virtual items, the virtual item is placed.

One aspect of the disclosure related to a system for granting bonuses to a user's in-game persona. The system may comprise one or more physical computer processors configured by machine-readable instructions to facilitate one or more elements, components, or components of a computer program.

The one or more processors may be configured to manage one or more affiliations within a game. The affiliations may comprise a discrete group of users with a relationship having a functional significance within the game that has an impact on game play. The affiliations may have associated affiliation virtual items that provide a benefit to members of the affiliation. For example, the one or more affiliations may include a first affiliation having an associated first affiliation virtual item that provides a benefit to members of the first affiliation.

The one or more processors may be configured to receive input by the user that indicates a first affiliation virtual item to upgrade or downgrade. Virtual items may have levels having level values indicating an ability and/or a benefit level of the virtual item. Virtual items may have quality levels indicating individual qualities that the virtual item may have or may provide to the user and/or user character within the game. The levels and/or qualities may be upgraded or downgraded by the user. Upgrading the levels and/or qualities may increase or decrease abilities of the item and/or benefits provided to the user and/or user character.

The one or more processors may be configured by machine readable instructions to upgrade the first affiliation virtual item, wherein upgrading the first affiliation virtual item increases a benefit to the members of the affiliation. The one or more processors may be configured by machine readable instructions to downgrade the first affiliation virtual item, wherein downgrading the first affiliation virtual item reduces a benefit to the members of the affiliation. Upgrading an affiliation virtual item may include increasing the level and/or level value of the affiliation virtual item and/or increasing the number of bonuses provided by the affiliation virtual item and/or increasing the quality value of the bonuses provided by the affiliation virtual item. Downgrading an affiliation virtual item may include decreasing the level and/or level value of the affiliation virtual item and/or decreasing the number of bonuses provided by the affiliation virtual item and/or decreasing the quality value of the bonuses provided by the affiliation virtual item.

The one or more processors may be configured to define an interface that allows a user to place the first affiliation virtual item in a first slot within the interface. The first affiliation virtual item may comprise a first quality value and/or a first level value. The first quality value and/or the first level value may provide an associated first benefit level to the members of the affiliation. The one or more processors may be configured by machine readable instructions to receive input by the user to place the first affiliation virtual item in the first slot.

The one or more processors may be configured by machine readable instructions to establish, responsive to reception of the input, a set of one or more quality bonuses based on the first quality value of the first affiliation virtual item. Responsive to reception of the input, a level bonus for each of the one or more quality bonuses based on the first level value may be established.

The interface may be caused to offer the user the ability to upgrade the first affiliation virtual item. Upon acceptance of the offer, a determination of whether the first virtual item is upgraded or broken may be determined. The level bonus for each of the one or more quality bonuses may be increased, responsive to the first virtual item being upgraded. The level nonus for each of the one or more quality bonuses and the level bonuses may be decreased, responsive to the first virtual item being broken.

The one or more processors may be configured by machine readable instructions to provide each of the one or more quality bonuses and the level bonus for each of the one or more quality bonuses to the in-game personas of the members of the affiliation.

In some implementations, providing each of the one or more quality bonuses and/or the level bonus for each of the one or more quality bonuses (collectively "the bonuses") involves modifying the bonuses based in part on a bonus weighting value that is associated with the slot that the affiliation virtual item is placed in in the interface, and then providing the modified bonuses to the user.

In some implementations, the interface may be caused to offer to the user the ability to enhance the one or more quality bonuses (which is different than upgrading the level value). If the user accepts the offer to enhance the item, the method may include determining whether the affiliation virtual item is enhanced or broken. If the affiliation virtual item is enhanced, an additional quality bonus may be added to the set of one or more quality bonuses. If, the item is broken however, each of the one or more quality bonuses and the level bonus for each of them may be decreased, in some versions decreased to the point of being negated.

The one or more processors may be configured by machine readable instructions to obtain a set of probabilities for upgrading or enhancing the affiliation virtual item and upgrading or enhancing the affiliation virtual item based on the obtained set of probabilities. The obtained set of probabilities may be associated with additional virtual items, such that individual ones of the additional virtual items may have higher probabilities when used to enhance or upgrade an affiliation virtual item compared to other virtual items.

In some versions, determining whether the affiliation virtual item is upgraded/enhanced or broken involves assigning a percentage likelihood of the affiliation virtual item being upgraded/enhanced, generating a random number, and then upgrading/enhancing the affiliation virtual item if the random number is less than the percentage likelihood of the virtual item being upgraded/enhanced or breaking the virtual item if the random number is greater than the percentage likelihood. In some implementations, the offer to upgrade/enhance the virtual item may include a requirement that the user pay an amount of virtual currency to accept the offer. Additionally or alternatively, the offer to upgrade/enhance the virtual item may include an option for the user to prevent the virtual item from breaking if the user provides a second virtual item. The offer to upgrade/enhance the virtual item may include an option for the user to increase the chance of the virtual item being upgraded/enhanced by providing a second virtual item.

In some versions, the interface may have multiple slots for virtual items. In these versions, the method may include allowing the user to place a second virtual item in a second slot within the interface. The second virtual item may have its own level value and/or a quality value. If this is done, bonuses may be provided to the user based on the second virtual item's level value and quality value. The processors may be configured to obtain a set of probabilities for upgrading the first affiliation virtual item, wherein the set of probabilities is based on the level value and/or quality value of the second virtual item. The first affiliation virtual item may be upgraded or downgraded based on the obtained set of probabilities.

In some implementations, the user is offered the ability to repair the virtual item if it is broken. The offer to repair the virtual item may include a requirement that the user pay an amount of virtual currency or provide virtual items to accept the offer. If the user accepts the offer, the broken item may be repaired and the quality bonuses and the level bonus for each quality bonus may be increased and/or restored. A set of probabilities may be obtained which may be used when restoring the previously broken affiliation virtual item. The probabilities may be based on the amount of virtual currency of virtual items provided to accept the offer.

In some versions, the interface may be caused to offer the user the ability to enhance the affiliation virtual item. Enhancing may refer to adding additional quality bonuses to an item, e.g., if an item currently has two quality bonuses, after being enhanced the item may have three quality bonuses. In these versions, the method may include determining, responsive to the user accepting of the offer, whether the virtual item is enhanced or the virtual item becomes broken. If the item is enhanced, an additional quality bonus is added to the set of one or more quality bonuses responsive to the first virtual item being enhanced. If the item is broken, each of the one or more quality bonuses and the level bonus for each may be decreased responsive to the virtual item being broken. Then, each of the one or more quality bonuses and the level bonus for each of the one or more quality bonuses are provided to the user's in-game persona.

The offer to upgrade the affiliation virtual item may be provided to individual ones of the users of an affiliation when those users have progressed to or past a specified point in the game, amassed a specified amount of experience points, resources or completed other achievements in the game. The offer to upgrade the affiliation virtual item may be provided to users of an affiliation when a threshold number of the users have achieved a specified accomplishment in the game, such as passed a specified point in the game, amassed up to or in excess of a specified amount of experience points, resources, etc.

The offer to upgrade the affiliation virtual item may be provided to members having an affiliation in response to at least a specified threshold of affiliation members each contributing a specified second virtual item and/or a specified amount of a second virtual item. Second virtual items may be virtual items usable in the game. Second virtual items may be virtual currency associated with the game.

Notifications may be provided to members of the affiliation notifying them of the progress to upgrading the affiliation virtual item. For example, to members of the affiliation who have yet to contribute, a notification may be provided providing an indication of the number of members of the affiliation who have contributed and/or the number of members required to contribute to upgrade the affiliation virtual item.

Offers to upgrade the affiliation virtual items may be provided during events in the game. Such that the offer becomes available to users at the commencement of the event, and ceases to be available at the cessation of the event.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
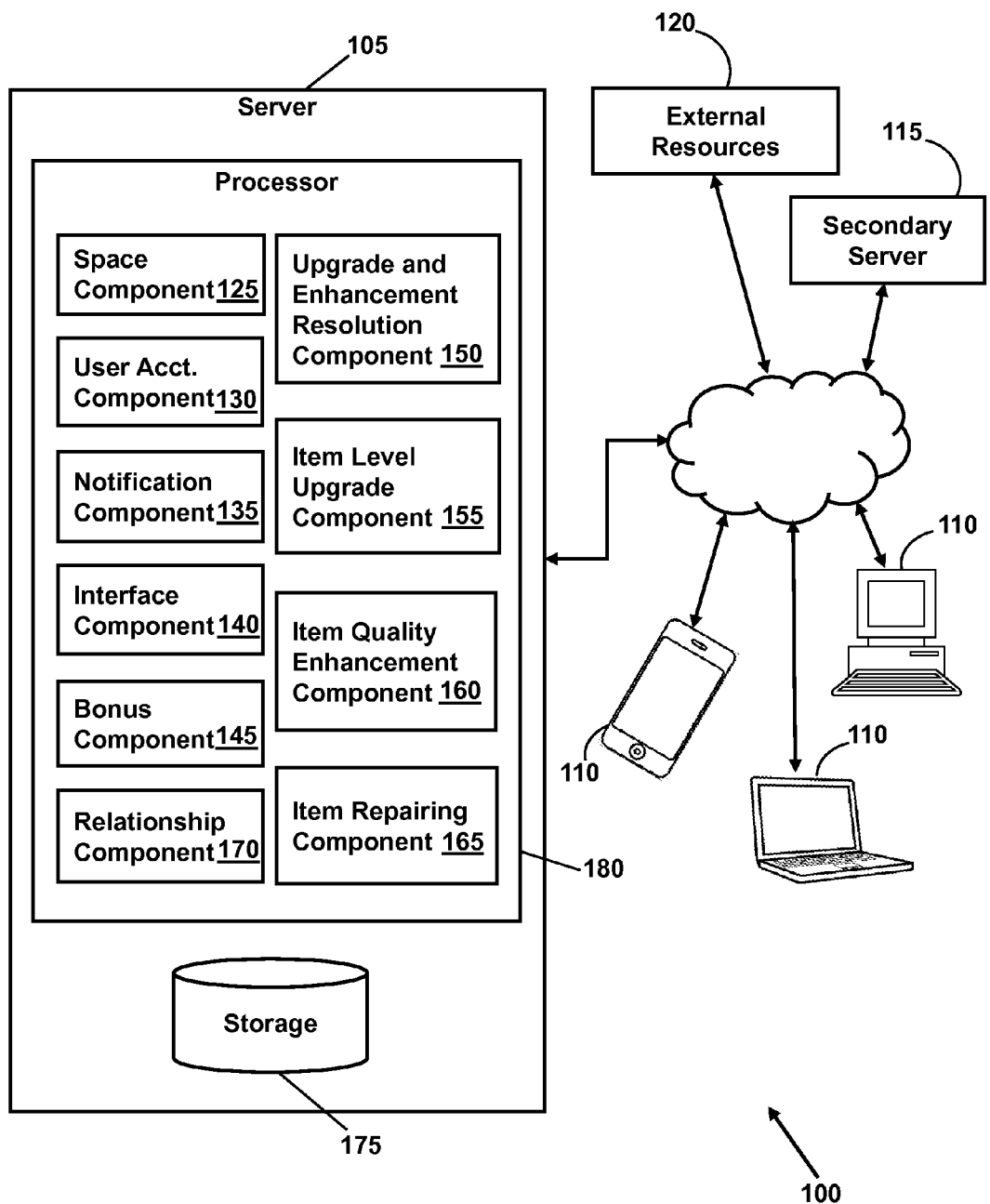
FIG. 1 illustrates a system configured to extend a user's play of an online game.

FIG. 1 illustrates a system 100 configured to grant bonuses to a user's in-game persona. System 100 may enable users to play the online game. The online game may be any type of game accessible through any type of network. For example, the online game may be an online social game, and, system 100 may enable an individual user to log into the online game from any of a plurality of different game platforms. In some implementations, system 100 may include a server 105. Server 105 may be configured to communicate via one or more electronic communication links with one or more client computing platforms 110 and/or secondary servers 115 according to a client/server architecture communicated over a network 120, e.g., the Internet, wide area network (WAN), local area network (LAN), or the like. The users may access system 100 and/or the online game via client computing platforms 110. In some implementations, system 100 may include other elements. Server 105 is illustrated as a single element in FIG. 1, but may be comprised of multiple elements, such as a virtual space server, a system server, and/or other elements.

Server 105 may be configured to execute one or more computer program components. The one or more computer program components may include one or more of a space component 125, a user account component 130, a notification component 135, and interface component 140, a bonus component 145, an upgrade and enhancement resolution component 150, an item level upgrade component 155 and item quality enhancement component 160, an item repairing component 165, an relationship component 170, and/or other components.

Space component 125 may be configured to host a virtual space for access by users via client computing platforms 110. Space component 125 may be configured to implement the instance of the virtual space executed by the computer components to determine the state of the virtual space. The state may then be communicated (e.g., via streaming visual data, via object/position data, and/or other state information) from server 105 to client computing platforms 110 for presentation to users. The state determined and transmitted to a given client computing platform 110 may correspond to a view for a user character being controlled by a user via the given client computing platform 110. The state determined and transmitted to a given client computing platform 110 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The views may be presented to the users within user interfaces of applications being executed on client computing platforms 110 (e.g., web browsers). In some implementations, individual client computing platforms 110 may execute instances of the virtual space. In such implementations, client computing platforms 110 may generate views from a locally executed instance, or may receive view information from another client computing platform 110 in a peer-to-peer configuration. Space component 125 may execute an instance of the virtual space used to update, authenticate, confirm results from, and/or work in other ways with the instances of the virtual space executed locally on client computing platforms 110 to provide a virtual space in which users can interact with each other.

In some implementations, the virtual space (and/or the online game) may be accessed through one of a plurality of different gaming platforms, social platforms, social gaming platforms, social networking platforms, application platforms and/or other platforms provided by one of secondary servers 115. Any platform that can provide games or virtual spaces and allows users to interact, e.g., Kabam.com, Steam, Kongregate, and the like, are within the scope of the invention with respect to "platforms." In such implementations, accessing the virtual space through a given platform may include logging into the virtual space through the given platform, receiving a view of the virtual space within a user interface associated with the given platform (e.g., within a web page hosted by the given social networking platform), and/or other mechanisms for accessing the virtual space from the given platform.

The users may participate in the virtual space (and/or the online game that takes place therein) by inputting input commands to their respective client computing platforms 110 that request an action to be taken within the instance of the virtual space (e.g., manipulate an object, build a building, control a character, and/or other actions). The input commands may then be implemented in the virtual space through the initiation of the requested actions (e.g., by space component 125 on server 105, in one or more instances of the virtual space on client computing platform(s) 110, etc.). The instance of the virtual space may comprise a simulated space that is accessible by users via clients (e.g., client computing platforms 110) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 125 is not intended to be limiting. The space component 125 may be configured to express the virtual space in a more limited or more rich manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters, buildings, or a realm present at the location. In some implementations of the online game, buildings or an entire realm may perform actions in a manner similar to the way characters perform actions in other games, e.g., attack other players, other player's characters, other player's buildings, or perform similar defensive actions. Additionally or alternatively, buildings or a realm may generate resources or units of characters that can perform actions on behalf of the user. Text may be used to express the actions of the characters, buildings, or realm present at the location (and/or effects of the actions or properties), and/or actions of the characters, buildings or realm (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space component 125, users may control characters, buildings, or a realm to interact with the virtual space and/or each other. As used herein, the terms "character", "building", or "realm" may refer to an object (or group of objects) present in the virtual space that represents an individual user as an in-game persona. The in-game persona may be controlled by the user with which it is associated. The in-game persona may interact with the virtual space (e.g., non-player characters in the virtual space, other objects in the virtual space), or the in-game persona may be relatively static visually within views of virtual space. The in-game persona representing a given user may be created and/or customized by the given user. The in-game persona may have an "inventory" of virtual goods and/or currency that the user can use (e.g., by manipulation of a character, a building, or a realm or other user controlled element, and/or other items), display, gift, and/or otherwise interact with within the virtual space.

The users may participate in the instance of the virtual space by controlling one or more of the available user controlled elements in the virtual space. Control may be exercised through control inputs and/or commands input by the users through client computing platforms 110. The users may interact with each other through communications exchanged within the virtual space. Such communications may include one or more of textual chat, instant messages, private messages, voice communications, and/or other communications. Communications may be received and entered by the users via their respective client computing platforms 110. Communications may be routed to and from the appropriate users through server 105 (e.g., through space component 125).

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

User account component 130 may be configured to manage user accounts associated with individual users. The user accounts may include information stored by server 105, one or more of the client computing platforms 110, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

As mentioned above, in some implementations, the user account component 130 includes information about one or more inventories of virtual items associated with the user account and available to a user's in-game persona. For a given user, the user account may include information for one or more in-game personas that are associated with the user in the virtual space. The in-game personas may be persistent within the virtual space. The in-game personas may be controllable by the given user in the virtual space. Controlling the in-game personas may enable the given user to advance within the online game (e.g., as the user progress through the game content available in the virtual space). The given user may be able to control a plurality of the in-game persona within the virtual space simultaneously. The given user may only be able to play one of the in-game personas in the online game in the virtual space at a time. Individual ones of the in-game personas may be unique within the virtual space (e.g., have a unique appearance, a unique name, a unique score or inventory, and/or be unique in other ways). The in-game personas for which information is saved in the user profile of the given user may be exclusive to the given user. That is, the given user may be the only user that controls those in-game personas. The information included in the user account for a given in-game persona may include one or more of a progress level, a status, a score, an inventory, and/or other information.

The information included in the user accounts may include authentication information for platforms provided over one or more networks, for example, social network authentication information, game platform authentication information, social media authentication information, and/or other types of authentication information. Social authentication information for a given user may include authentication information used to log into a social networking platform (e.g., username, password, and/or other authentication information), an identifier or other authentication information assigned to the given user by a social networking platform (e.g., without disclosing the authentication information to the given user), an authentication token or key, and/or other authentication information. User account component 130 may be configured such that an individual user may have a user account that includes social network authentication information from a plurality of different social networking platforms. This may enable the user to log into the virtual space (and/or the online game) from any one of the plurality of different social networking platforms. This may enhance accessibility to the virtual space (and/or the online game) for the user, in contrast to conventional systems in which a user logging into an online game can only do so from an individual social networking platform.

Notification component 135 may be configured to generate notifications to platforms, such as social networking platforms, gaming platforms, and/or other platforms, indicating activity by the users in the online game session. This may include, responsive to a user performing an action in the online game session that triggers a notification, generating notifications of the action to a plurality of social networking platforms on which the user has accounts. The notifications may cause an indication of the action to be displayed on walls (explained below) or similar spaces of the user in the social networking platforms. The notifications may provide indications to users of the social networking platforms that are linked with the user (e.g., through a friend relationship, through a link, and/or other relationships). The notifications may be selectable by the other users to gain access to the virtual space (and/or the online game). Generating the notifications for the individual user to a plurality of social networking platforms may be enabled by the storage by user account component 130 of information related to user accounts of the individual user on the plurality of social networking platforms (e.g., social network authentication information and/or other information).

Secondary servers 115 may be configured to host a plurality of secondary platforms. Secondary platforms may include online services or and/or sites that focus on building and reflecting networks or social relations among people. Secondary platforms may include online services that are focused on game play with collaborative elements, such that teams of users within the games, or across multiple games are formed through the secondary platforms. These services and/or sites may enable users to form connections between each other that signify friendships, game relationships, kinship, romantic relationships, professional relationships, and/or other relationships. These services and/or sites typically enable communication between users, and may provide individual users with "walls". The secondary platform may facilitate notification to other users of the user's activities within or associated with the secondary platform. For example, the notifications may provide information on the user's activities within one or more of the games provided through, or associated with, the secondary platform. Other examples are a user's wall in a social networking platform which may refer to a set of content that is available for viewing by other users (e.g., users that are linked to the user), and pertains to the user. The content on the user's wall may include content posted by the user, content posted by other users (e.g., users linked to the user), and/or other content. Content from the user's wall may be provided to other users (e.g., in their "feeds") in a broadcast manner.

The relationship component 170 may be configured to establish relationships between users within the virtual space. Such relationships may include one or more of friendships, guilds (with guild-mates), alliances, connections, followers, affiliations, and/or other relationships. The relationship component 170 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

Relationships between users may have a functional significance within the game. Such functional significance may impact game play. The relationship component 170 may be configured to manage one or more affiliations within a game. The relationship component 170 may be configured to manage one or more affiliations across multiple games provided by the same game provider and/or provided by multiple game providers. The relationship component 170 may be configured to obtain relationship information about users from one or more games, or other online platforms, such as social networking platforms, blogs, internet usage history, and other online entities, to determine relationships of the user. The relationship component 170 may be configured to provide recommendations to users for establishing affiliations and/or relationships based on the obtained relationship information about the users.

The affiliations may comprise a discrete group of users with a relationship having a functional significance within the game that has an impact on game play. The affiliations may have associated affiliation virtual items that provide a benefit to members of the affiliation. For example, the one or more affiliations may include a first affiliation having an associated first affiliation virtual item that provides a benefit to members of the first affiliation.

Figure 7:
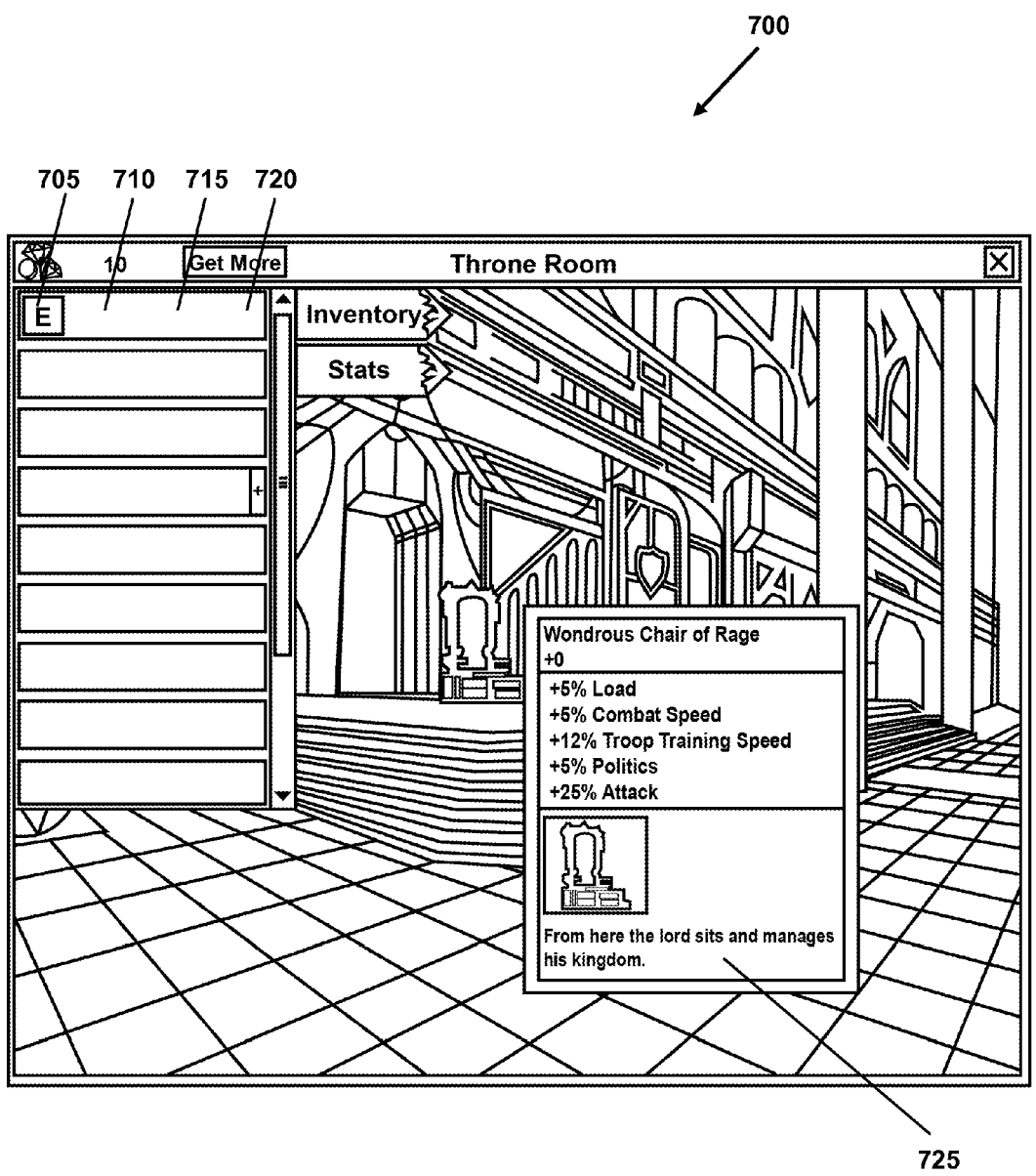
FIG. 7 depicts an interface that has one or more slots where virtual items may be placed.

Interface component 140 may be configured to provide a user with an interface with one or more slots, with each slot configured to store an affiliation virtual item. An example of the interface is shown in FIG. 7. In FIG. 7, the interface 700 has one or more slots 705, 710, 715, 720 where affiliation virtual items may be placed. In FIG. 7, a "Wondrous Throne of Rage +0" is in slot 705. A "card" portion 725 of the interface may show the user bonuses that the affiliation virtual item confers on the user's in-game persona. The affiliation virtual items may have a quality value, e.g., from lowest quality to highest: Simple, Common, Uncommon, Rare, Epic, or Wondrous. There may be one or more quality bonuses that are based on the quality value, with a higher quality value conferring more quality bonuses to the affiliation virtual item. For example, a quality level of Simple may provide zero or no quality bonuses to the item. A quality level of Common may provide one quality bonus to the item. A quality level of Uncommon may provide two quality bonuses to the item. A quality level of Rare may provide three quality bonuses to the item. A quality level of Epic may provide four quality bonuses to the item. A quality level of Wondrous may provide five quality bonuses to the item. For example, card 725 in FIG. 7 shows that the "Wondrous Throne of Rage +0" confers five bonuses to the user's in-game persona: +5% Load, +5% Combat Speed, +12% Troop Training Speed, +5% Politics, and +25% Attack. These examples are not intended to be limiting and there may be more or fewer quality bonuses available and called by different names. If an item is enhanced, it goes from one quality level to the next quality level, e.g., from Uncommon to Rare. This means that an item that previously provided two quality bonuses would provide three quality bonuses after being enhanced.

The affiliation virtual items may have a level value. The virtual item may have a level bonus for each of the quality bonuses, with the level bonus being based on the level value. For example, an affiliation virtual item with an Uncommon quality may have two quality bonuses and a level value of zero. One quality bonus may be a bonus to a "ranged defense" attribute. Another quality bonus may be to a "ranged life" attribute. With a level value of zero, the quality bonus for "ranged defense" may provide a one percent increase to the user's in-game persona and the quality bonus for "ranged life" may confer a five percent increase to the user's in-game persona. If the item is upgraded, its level value is increased and the existing quality bonuses each get a higher level-based bonus. For example, if the item was upgraded from level zero to level one, there may be a level bonus to the quality bonus for "ranged defense" of one-half percent for a total bonus conferred to the user's in-game persona of one and one-half percent. Also, at a level value of one, there may be a level bonus to the quality bonus for "ranged life" of two percent for a total conferred bonus of seven percent.

The number of quality bonuses an item has and the amount of bonus that each quality bonus provides may change independently of each other. That is, an item may be upgraded several times from level two to level five and yet always have only two quality bonuses. Conversely, an item may be enhanced several times such that the item goes from providing only one quality bonus to providing four quality bonuses, but the item may stay at level two regardless of the number of quality bonuses that are provided. As an example, the "Wondrous Throne of Rage +0" in FIG. 7 is a level zero item as indicated by the "+0", even though it confers five quality bonuses.

Referring back to FIG. 1, in some versions, there may be a bonus component 145 configured to quality bonuses and the level bonus for each quality bonuses to the user's in-game persona. The bonus component 145 may read the affiliation virtual item's quality bonuses and the level bonuses for the quality bonuses and when the game involves an aspect of the game that a bonus is related to, the quality bonus and the level bonus for that quality bonus is applied to the aspect. For example, if the user has an Uncommon item with a level value of one that grants a ranged defense bonus of one and one-half percent, if the user's in-game persona is being attacked by a ranged unit, the bonus component 145 increases the user's in-game persona's ranged defense attribute by one and one-half percent. Non-limiting examples of bonuses include increases/decreases to attack range, speed, or power, increases/decreases to defense range, speed, or power, increases/decreases to unit movement speed, increases/decreases to building construction time, increases/decreases to experience or other metrics earned, e.g., competitive metrics such as "might", and/or increases/decreases to virtual currency and/or items found and/or won in battle.

In some implementations, there may be an upgrade and enhancement resolution component 150 configured to determine whether an upgrade or an enhancement is successful. The upgrade and enhancement component may in some instances be one component and in other instances be two separate components, one that resolves upgrades and one that resolves enhancements. In either scenario, the upgrade and enhancement resolution component 150 may include a percentage likelihood of the upgrade or enhancement being successful. In some instances the percentage likelihood decreases as the level value or quality value increases, i.e., the higher the level of the item or the better the quality of the item, the more difficult it may be to increase the level value or quality value, respectively. For example, upgrading an item from level zero to level one may have a likelihood of ninety percent. An upgrade from level four to level five may have a thirty percent likelihood of success. This percentage likelihood may be stored in a database or a spreadsheet file that the upgrade and enhancement resolution component reads from that a game developer or publisher or the like may edit to adjust the game. There may also be a random number generator configured to generate a random number for use in determining whether an upgrade or enhancement is successful. In some implementations, there may be a resolving component configured to upgrade or enhance the item if the random number generated by the random number generator is less than or equal to the percentage likelihood of the level value or the quality value being increased; and break the affiliation virtual item if the random number is greater than the percentage likelihood of the upgrade or enhancement being successful.

If an item is "broken," this may be designated by a flag or variable, e.g., a Boolean variable, associated with, or a property of, the affiliation virtual item, whereby if the flag or variable is set to TRUE (or FALSE, depending on implementation), the item is considered "broken." In some versions, the upgrade and enhancement resolution component 150 breaks an item if the upgrade or enhancement is not successful. In some cases, if the affiliation virtual item is broken, all quality bonuses and level bonuses for each of the quality bonuses are decreased, in some versions decreased to the point of being negated, until the item is repaired. In other implementations, if the item is broken, the quality bonuses and level bonuses for each of the quality bonuses are simply decreased until the item is repaired.

Figure 2:
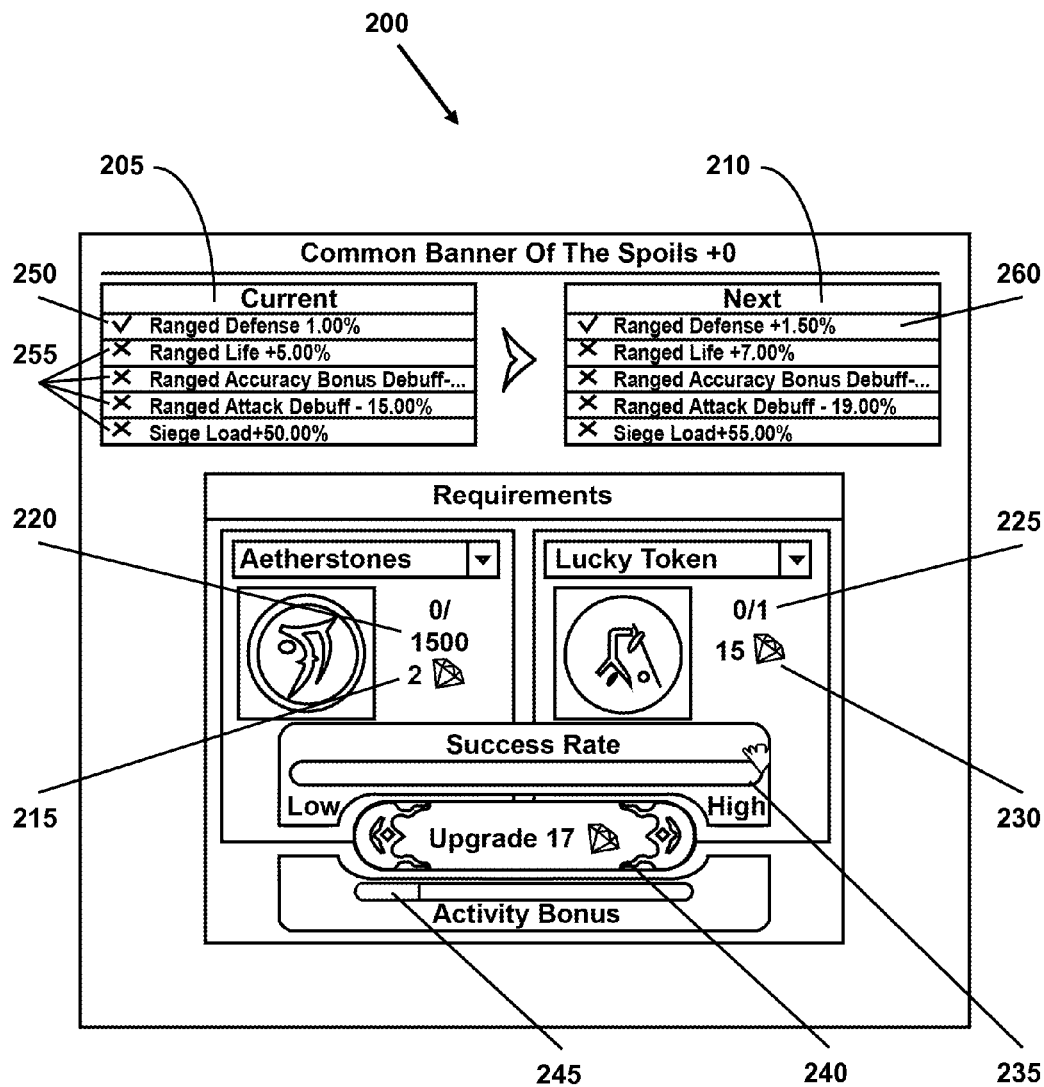
FIG. 2 depicts an interface to upgrade an affiliation virtual item.

In some versions, there may be an item level upgrade component 155 configured to offer the user to upgrade the level bonus for each of the one or more quality bonuses. This offer is typically made through an interface 200 as shown in FIG. 2. The interface 200 shows the current level bonus for each of the one or more quality bonuses 205 and next level bonus for each of the one or more quality bonuses 210 if the upgrade is successful. In some implementations, the item level upgrade component 155 may be configured to require that the user pay an amount of virtual currency or affiliation virtual items to accept the offer. For example, as shown in FIG. 2, the item level upgrade component 155 offers the user (through the interface 200) to upgrade a Common Banner of The Spoils affiliation virtual item. To upgrade the affiliation virtual item, the user may provide virtual currency or another virtual item, e.g., two gems 215 (a currency) or fifteen hundred "Aetherstones" 220 (a virtual item). In some versions, the item level upgrade component 155 is further configured to provide an option through the interface 200 for the user to prevent the item from breaking by providing virtual currency or a second virtual item. For example, in FIG. 2, the user may provide one Lucky Token 225 (a virtual item) or fifteen gems 230 (virtual currency). In cases where the user pays to protect the item from breaking, even if the item is not successfully upgraded, the item may not be designated as broken or the item may be instantly repaired. In some instances, the item level upgrade component 155 may be further configured to provide an option for the user to increase the chance of the upgrade being successful if the user provides a second virtual item. In this case, the second virtual item may increase the likelihood of success of the upgrade, e.g., going from level four to five may have a thirty percent likelihood of success, but if the player provides a Lucky Token, the Lucky Token may add fifty percent to the likelihood of success, thereby making the likelihood of success eighty percent in total. This may be done in addition to or as an alternative to providing a second virtual item to prevent the item from breaking. In some instances, providing a second virtual item, e.g., a Lucky Token, or additional virtual currency, e.g., additional gems, may cause the upgrade to skip levels, e.g., instead of the item going from level zero to one, the item goes from level zero to two. In some implementations, the number of levels skipped may depend on the number of second virtual items or additional virtual currency spent.

Additionally or alternatively, the user may instead be required to take some form of out-of-game action to pay for the upgrade, e.g., rather than paying in virtual currency or objects, the user may pay for the upgrade by posting something related to the game on the user's wall a social network page (via the notification component 135).

In some implementations, the interface 200 provides an indicator 235 of the likelihood of success, i.e., the success rate, of the upgrade. As discussed above, this success rate may change if the user provides additional virtual goods. Additionally or alternatively, the likelihood of success may change or a bonus to the chance of success may be applied if the user repeatedly attempts the upgrade, e.g., the likelihood of success may increase to incentivize the user to keep spending virtual goods or it may decrease, e.g., as a story element that the item degrades over time. In some implementations the reward for attempting to upgrade several times may be displayed as an "Activity Bonus" 245 where the more the user tries to upgrade the item, the more likely he or she is able to have the next upgrade be successful. In some implementations, there may be a maximum number of attempts that the user is allowed before the item has either a one-hundred percent likelihood of success or alternatively a zero percent chance of success.

If the user chooses to accept the offer, the user may press the "upgrade" button 240. In the example shown, the user may pay for the upgrade and at the same time prevent the item from breaking by paying for the upgrade with seventeen gems. In some implementations the item level upgrade component 155 may be further configured to upgrade the level bonus for each of the one or more quality bonuses if the user accepts the offer to upgrade the virtual item and the upgrade and enhancement component determines the upgrade is successful. In the implementation shown in FIG. 2, the active bonuses are displayed with check marks 250, 260 next to them and the inactive bonuses are displayed with Xs 255 next to them. Before the upgrade, the user's persona is granted a bonus to "ranged defense" of one percent 250. If the upgrade is successful, the user's in-game persona is granted a bonus of one and one-half percent 260.

Figure 3:
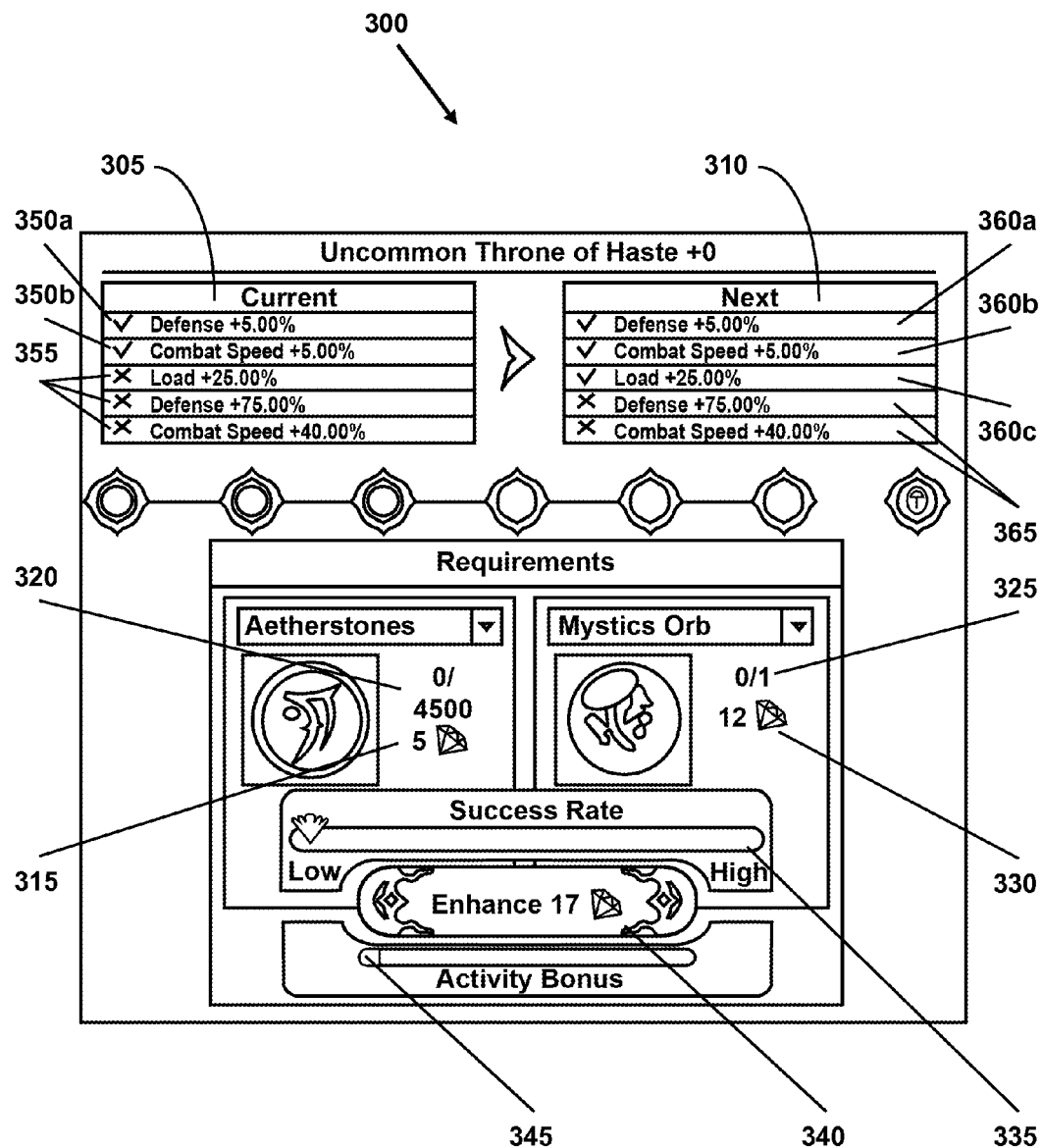
FIG. 3 depicts an interface to enhance an affiliation virtual item.

Referring back to FIG. 1, in some versions, an item quality enhancement component 160 may be configured to offer the user to enhance the set of one or more quality bonuses and further configured to add an additional quality bonus to the set of the one or more quality bonuses if the user accepts the offer to enhance the affiliation virtual item and the upgrade and enhancement component determines the enhancement is successful. An example of the item quality enhancement component 160 is shown in FIG. 3. In FIG. 3, this offer is typically made through an interface 300. The interface 300 shows the current set of quality bonuses 305 and the enhanced set of quality bonuses 310 if the enhancement is successful. The current set of quality bonuses 305 is two quality bonuses. If the enhancement is successful, the set of quality bonuses is increased to three quality bonuses. In some implementations, the item quality enhancement component 160 may be configured to require that the user pay an amount of virtual currency or virtual items to accept the offer. For example, as shown in FIG. 3, the item quality enhancement component 160 offers the user (through the interface 300) to upgrade an Uncommon Throne of Haste affiliation virtual item. To enhance the affiliation virtual item, the user may provide virtual currency or another virtual item, e.g., five gems 315 or forty five hundred "Aetherstones" 320. In some versions, the item quality enhancement component 160 is further configured to provide an option through the interface 300 for the user to prevent the item from breaking by providing virtual currency or a second virtual item. For example, in FIG. 3, the user may provide one Mystic Orb 325 or twelve gems 330. In some instances, the item quality enhancement component 160 may be further configured to provide an option for the user to increase the chance of the enhancement being successful if the user provides a second virtual item. In this case, the second virtual item may increase the likelihood of success of the enhancement, e.g., going from Uncommon to Rare may have a thirty percent likelihood of success, but if the player provides a Mystic Orb, the Mystic Orb may add fifty percent to the likelihood of success, thereby making the likelihood of success eighty percent in total. This may be done in addition to or as an alternative to providing a second virtual item to prevent the item from breaking. In some instances, providing a second virtual item, e.g., a Mystic Orb, or additional virtual currency, e.g., additional gems, may cause the enhancement to skip quality levels, e.g., instead of the item going from providing one quality bonus to providing two quality bonuses, the item goes from providing one quality bonus to providing three quality bonuses. In some implementations, the number of quality levels skipped may depend on the number of second virtual items or additional virtual currency spent. This may be done in addition to or as an alternative to providing an item to prevent the item from breaking. In some implementations, the interface 300 provides an indicator 335 of the likelihood of success, i.e., the success rate, of the enhancement. As discussed above, this success rate may change if the user provides additional virtual goods. Additionally or alternatively, the likelihood of success may change if the user repeatedly attempts the enhancement, e.g., the likelihood of success may increase to incentivize the user to keep spending virtual goods or it may decrease, e.g., as a story element that the item degrades over time. As described above with regard to upgrading, an Activity Bonus 345 may be available during enhancements as well to increase the likelihood of success, where the more time the user attempts to enhance the item, the more likely a successful enhancement will occur. In some implementations, there may be a maximum number of attempts that the user is allowed before the item has either a one-hundred percent likelihood of success or alternatively a zero percent chance of success.

If the user chooses to accept the offer, the user may press the "enhance" button 340 to attempt the enhancement. In the example shown, the user may pay for the enhancement and prevent the item from breaking by paying for the enhancement with seventeen gems. In some implementations the item quality enhancement component 160 may be further configured to enhance the set of quality bonuses by adding an additional quality bonus (or more than one) if the user accepts the offer to enhance the affiliation virtual item and the enhancement and enhancement component determines the enhancement is successful. In some versions, the item quality enhancement component 160 and the item upgrade component are the same component. In the implementation shown in FIG. 3, the active bonuses before the enhancement are displayed with check marks 350a, 350b next to them and the inactive bonuses are displayed with Xs 355 next to them. After the enhancement, the active bonuses are displayed with check marks 360a, 360b, 360c next to them and the inactive bonuses are displayed with Xs 365 next to them. As shown, there is one more active bonus "Load +25.00%" 360c after the enhancement that was previously one of the inactive bonuses 355.

Referring back to FIG. 1, in some versions, there is an item repairing component 165. The item repairing component 165 may be configured to offer the user to repair a broken affiliation virtual item for a cost. If the user accepts the offer, the affiliation virtual item is repaired and the one or more quality bonuses are increased and the level bonus for each of the one or more quality bonuses are also increased. In implementations where the item being broken negates all existing bonuses, repairing the affiliation virtual item restores the bonuses to the levels they were before the item was broken.

The offer to upgrade the affiliation virtual item may be provided to individual ones of the users of an affiliation when those users have progressed to or past a specified point in the game, amassed a specified amount of experience points, resources or completed other achievements in the game. The offer to upgrade the affiliation virtual item may be provided to users of an affiliation when a threshold number of the users have achieved a specified accomplishment in the game, such as passed a specified point in the game, amassed up to or in excess of a specified amount of experience points, resources, etc.

Figure 8:
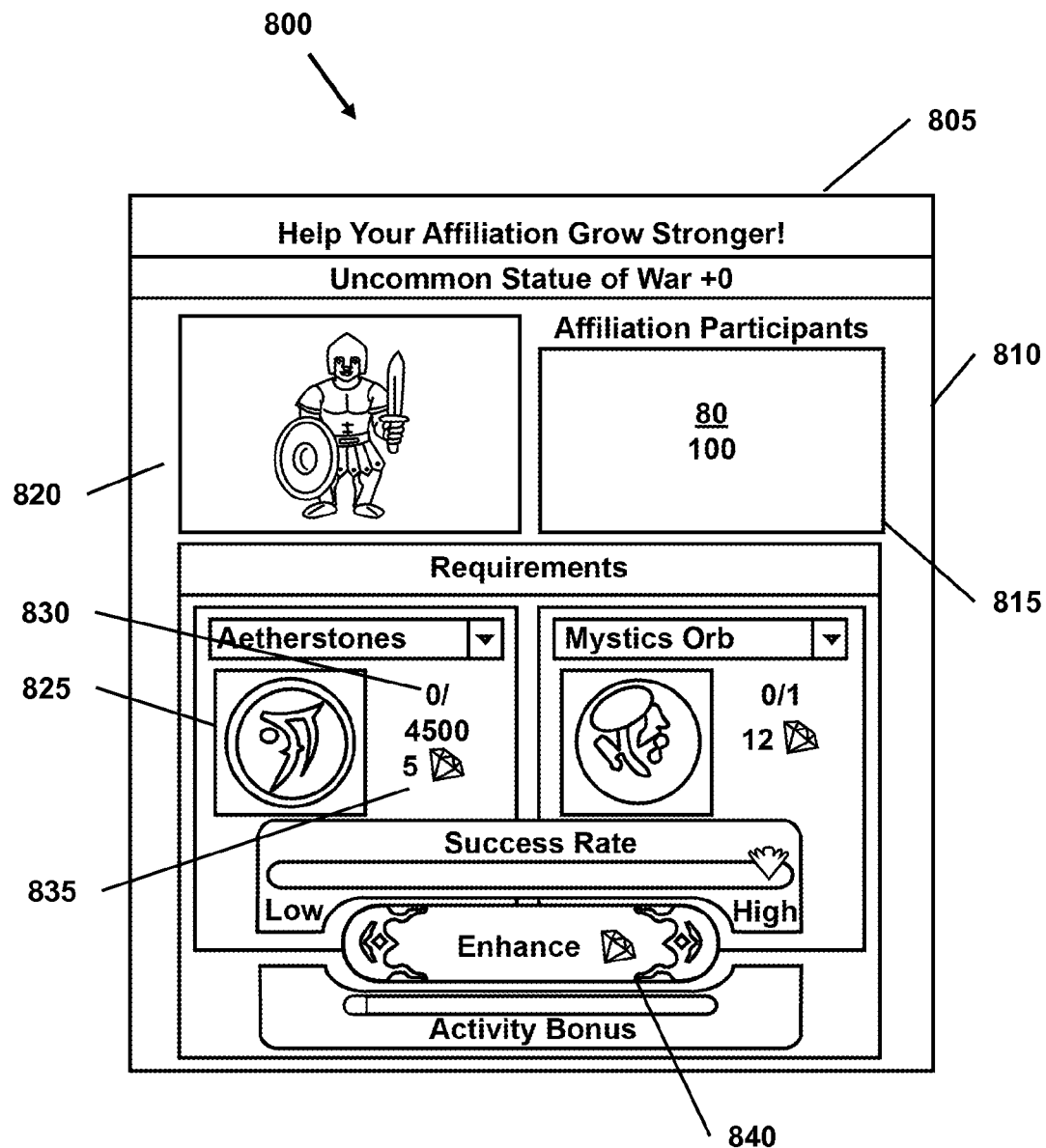
FIG. 8 depicts an interface to facilitate enhancing an affiliation virtual item.

The offer to upgrade the affiliation virtual item may be provided to members having an affiliation in response to at least a specified threshold of affiliation members each contributing a specified second virtual item and/or a specified amount of a second virtual item. Second virtual items may be virtual items usable in the game. Second virtual items may be virtual currency associated with the game. Referring to FIG. 8, illustrated is an example of an interface 800 for upgrading an affiliation virtual item in accordance with one or more implementations.

Notifications may be provided to members of the affiliation notifying them of the progress to upgrading the affiliation virtual item. For example, to members of the affiliation who have yet to contribute, a notification may be provided providing an indication of the number of members of the affiliation who have contributed and/or the number of members required to contribute to upgrade the affiliation virtual item. In a view of the game users having an affiliation may see a banner, symbols, and/or other notifications providing an indication that there is an affiliation virtual item that is available for upgrade or in the process of being upgraded and encouraging the affiliation member to participate. Such notifications may be provided to players when viewing interface 800 for upgrading an affiliation virtual item. A notification 805 may encourage users of the affiliation to participate in upgrading the affiliation virtual item so that all members of the affiliation, those members who have contributed, or some other users may receive a benefit associated with upgrading the affiliation virtual item.

Interface 800 may comprise at least an offer portion 810 providing an indication of an offer to users to upgrade an affiliation virtual item 820. The affiliation virtual item 820 may be any virtual item having a benefit associated with one or more affiliations. For example the affiliation virtual item 820 may be an object representing an increase in efficacy in combat units, or an increase in a user's ability or a user's in-game persona's ability to harvest crops, or to construct buildings, or provide additional or more advanced units, characters or other items of the user. The offer portion 810 of the interface 800 may comprise a notification of one or more second virtual item 825 required to upgrade the affiliation virtual item 820. Multiple second virtual items may be required to upgrade the affiliation virtual item 820. An option to select the use one or more of different second virtual items may be offered to the user in order to accept the offer to upgrade the affiliation virtual item 820. An option to provide an amount of virtual currency to accept the offer to upgrade the affiliation virtual item may be provided.

The interface 805 may provide a notification 815 of the number of affiliation members that have participated in the offer. The interface 805 may provide a notification of the number of affiliation members required to accept the offer in order to upgrade the affiliation virtual item. Providing a notification may incentivize affiliation members who have participated and/or accepted the offer to upgrade the affiliation virtual item to encourage other members of the affiliation to accept the offer.

The offer to upgrade one or more affiliation virtual items may comprise a total amount of virtual currency or a total number of one or more secondary virtual items required to be provided by affiliation members in order to receive the upgrade of the affiliation virtual item. Such amount of virtual currency and secondary virtual items may be provided by one or more of the members of the affiliation. Such a method would allow an accomplished member of an affiliation to upgrade the affiliation virtual item for the other members without requiring participation by those other members.

The affiliation virtual items may appear in a user's inventory. The virtual items required to accept the offer to upgrade the affiliation virtual items may be stored in the user's inventory prior to acceptance of the offer and may be removed from the user's inventory upon acceptance of the offer by the user. The affiliation virtual items may be stored in an affiliation inventory associated with the affiliation. The affiliation inventory may be managed by one or more members of the affiliation. In some implementations the affiliation inventory may be managed by one or more members of the affiliation having an indication that the members are in a leadership role within the affiliation.

A given client computing platform 110 may include one or more processors, and electronic display, a control interface, and/or other components. The one or more processors may be configured to execute computer program components. The computer program components may be configured to enable or user associated with the given client computing platform 110 to interface with system 100, and/or provide other functionality attributed herein to client computing platforms 110. For example, the computer program components may include a view component configured to receive view information from server 105 (e.g., generated by space component 125), and to present a view of the virtual game environment (e.g., as described above) based on the received view information. This may facilitate participation by the user of the given client computing platform 110 in the game taking place in the virtual game environment. By way of non-limiting example, the given client computing platform 110 may include one or more of a desktop computer, a laptop computer, a handheld computer, a tablet computing platform, a NetBook, a Smartphone, a gaming console, and/or other computing platforms.

Server 105 may include electronic storage 175, one or more processors 180, and/or other components. Server 105 may include communication lines, or ports to enable the exchange of information with a network and/or other computing platforms. Illustration of server 105 in FIG. 1 is not intended to be limiting. Server 105 may include a plurality of hardware, software, and/or firmware components operating together to provide the functionality attributed herein to server 105. For example, server 105 may be implemented "in the cloud" by a plurality of computing platforms operating together as server 105.

Electronic storage 175 may comprise electronic storage media that electronically stores information. The electronic storage media of electronic storage 175 may include one or both of system storage that is provided integrally (i.e., substantially non-removable) with server 105 and/or removable storage that is removably connectable to server 105 via, for example, a port (e.g., a USB port, a firewire port, etc.) or a drive (e.g., a disk drive, etc.). Electronic storage 175 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 175 may include one or more virtual storage resources (e.g., cloud storage, a virtual private network, and/or other virtual storage resources). Electronic storage 175 may store software algorithms, information determined by processor 180, information received from server 105, information received from client computing platforms 110, and/or other information that enables server 105 to function as described herein.

Processor(s) 180 is configured to provide information processing capabilities in server 105. As such, processor 180 may include one or more of a digital processor, an analog processor, a digital circuit designed to process information, an analog circuit designed to process information, a state machine, and/or other mechanisms for electronically processing information. Although processor 180 is shown in FIG. 1 as a single entity, this is for illustrative purposes only. In some implementations, processor 180 may include a plurality of processing units. These processing units may be physically located within the same device, or processor 180 may represent processing functionality of a plurality of devices operating in coordination. The processor 180 may be configured to execute components 125, 130, 135, 140, 145, 150, 155, 160, and/or 165. Processor 180 may be configured to execute components 125, 130, 135, 140, 145, 150, 155, 160, and/or 165 by software; hardware; firmware; some combination of software, hardware, and/or firmware; and/or other mechanisms for configuring processing capabilities on processor 180.

It should be appreciated that although components 125, 130, 135, 140, 145, 150, 155, 160, 165 and/or 170 are illustrated in FIG. 1 as being co-located within a single processing unit, in implementations in which processor 180 includes multiple processing units, one or more of components 125, 130, 135, 140, 145, 150, 155, 160, and/or 165 may be located remotely from the other components. As a non-limiting example, some or all of the functionality attributed to components 125, 130, 135, 140, 145, 150, 155, 160, and/or 165 may be provided "in the cloud" by a plurality of processors connected through a network. The description of the functionality provided by the different components 125, 130, 135, 140, 145, 150, 155, 160, and/or 165 herein is for illustrative purposes, and is not intended to be limiting, as any of components 125, 130, 135, 140, 145, 150, 155, 160, and/or 165 may provide more or less functionality than is described. For example, one or more of components 125, 130, 135, 140, 145, 150, 155, 160, and/or 165 may be eliminated, and some or all of its functionality may be provided by other ones of components 125, 130, 135, 140, 145, 150, 155, 160, and/or 165. As another example, processor 180 may be configured to execute one or more additional components that may perform some or all of the functionality attributed below to one of components 125, 130, 135, 140, 145, 150, 155, 160, and/or 165. Components 125, 130, 135, 140, 145, 150, 155, 160, and/or 165 may execute on one server, on multiple distinct servers, there may be a server for each respective component, or the components may be combined in any number of permutations to execute on any number of servers. Furthermore, server 105 may be a hardware server or it may be a process with a designated memory space executed on a hardware processor.

It will be appreciated that illustration in FIG. 1 and the description herein of components 125, 130, 135, 140, 145, 150, 155, 160, and/or 165 being provided for implementation with a single online game and/or virtual space (e.g., provided by space component 125) is not intended to be limiting. In some implementations, one or more of components 125, 130, 135, 140, 145, 150, 155, 160, and/or 165 may provide the functionality described herein for a plurality of separate online games and/or virtual spaces (e.g., provided by a plurality of space components). Such implementations may reduce redundancy of an entity that provides a plurality of different online games and/or virtual spaces to users through the social networking platforms. In such implementations, the one or more of components 125, 130, 135, 140, 145, 150, 155, 160, and/or 165 that are provided to serve a plurality of different online games (and/or virtual spaces) may be executed in a separate server from the server(s) executing the space components.

Figure 4:
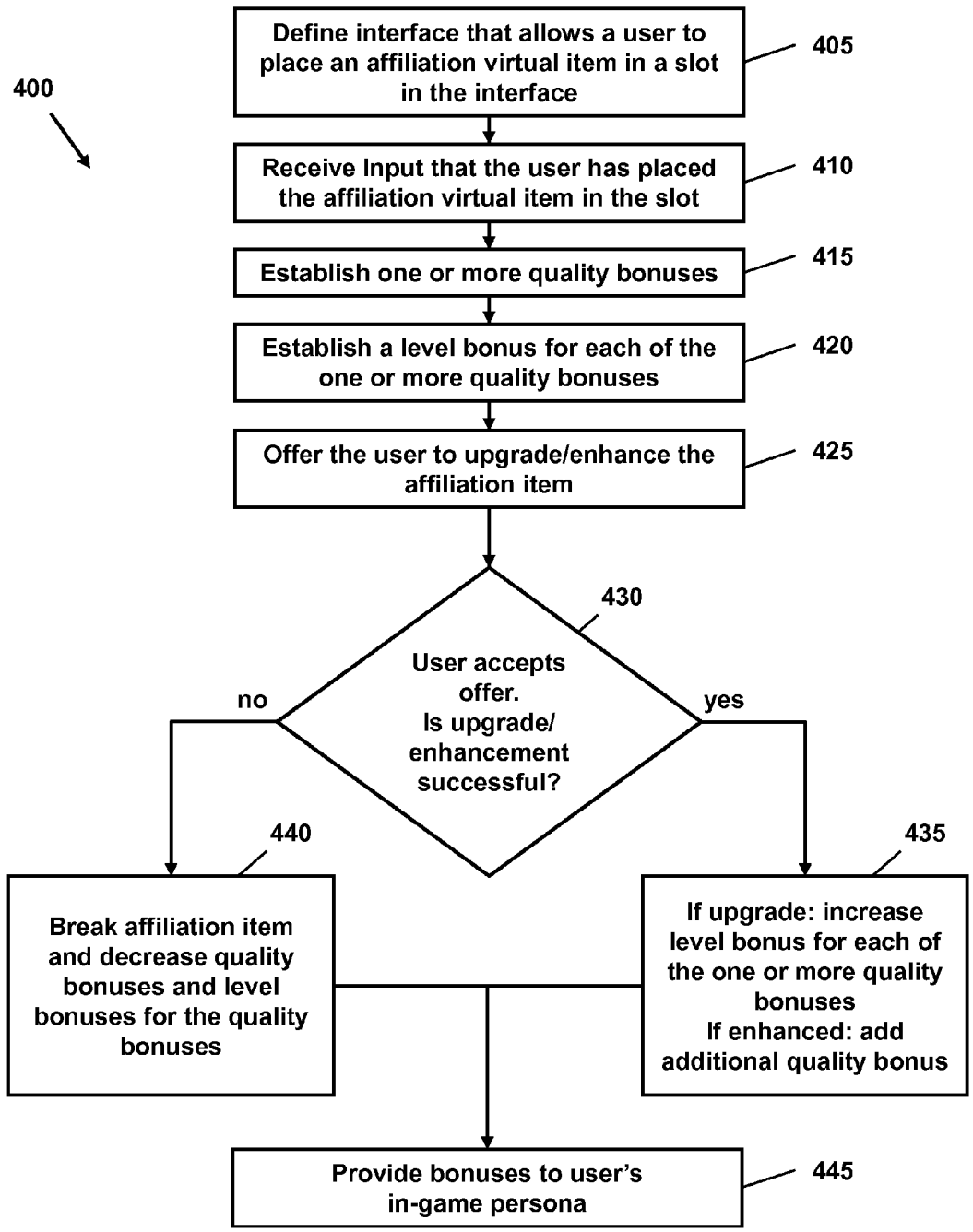
FIG. 4 depicts a method, executed on a computer processor, for granting bonuses to a user's in-game persona.

FIG. 4 depicts a method 400, executed on a computer processor, e.g., processor 180, for granting bonuses to a user's in-game persona. The method 400 begins by defining, at operation 405, an interface that allows a user to place a affiliation virtual item in a slot within the interface. The affiliation virtual item may be similar to that described above. The method 400 continues to operation 410 where input by the user is received, with the user placing the affiliation virtual item in the slot. At operation 415, responsive to reception of the input, a set of one or more quality bonuses is established based on the quality value. Also, at operation 420, a level bonus is established for each of the one or more quality bonuses, with the level bonuses being based on the level value. The order of the operations, e.g., 415 to 420 is not limiting, e.g., the level bonus may be established before the quality bonuses. The method 400 continues at operation 425 where the interface is caused to offer the user the ability to upgrade/enhance the affiliation virtual item. If the user accepts the offer, at operation 430 it is determined whether the affiliation virtual item is upgraded/enhanced or broken. If the affiliation virtual item is upgraded, the level bonus for each quality bonus is increased at operation 435 (in the case of the item being enhanced, an additional quality bonus is added to the set of quality bonuses). If the affiliation virtual item is broken though, each of the quality bonuses and the level bonus for each quality bonus is decreased at operation 440. Then quality bonuses and the level bonus for each quality bonus are provided to the user's in-game persona at operation 445.

In some versions, the quality bonuses and the level bonus for each quality bonus may be modified based in part on a bonus weighting value that is associated with the slot the item is in. For example, the interface may provide a slot for a "throne," a slot for a "window," a slot for a "banner", a slot for a "relic" and a slot for a "seneschal." An item placed in the throne slot may be given a weight of eighty-five percent, whereas an item placed in the banner slot may be given a weight of sixty five percent. Continuing the example, the item in the throne slot may have one quality bonus be "ranged defense +1%". Because the throne slot is weighted by eighty five percent, the item may actually confer a bonus of one percent multiplied by eighty five percent, i.e., a +0.85% increase to ranged defense. This in turn may make affiliation virtual items for a heavily weighted slot that convey a desirable bonus more valuable in the game.

Figure 5:
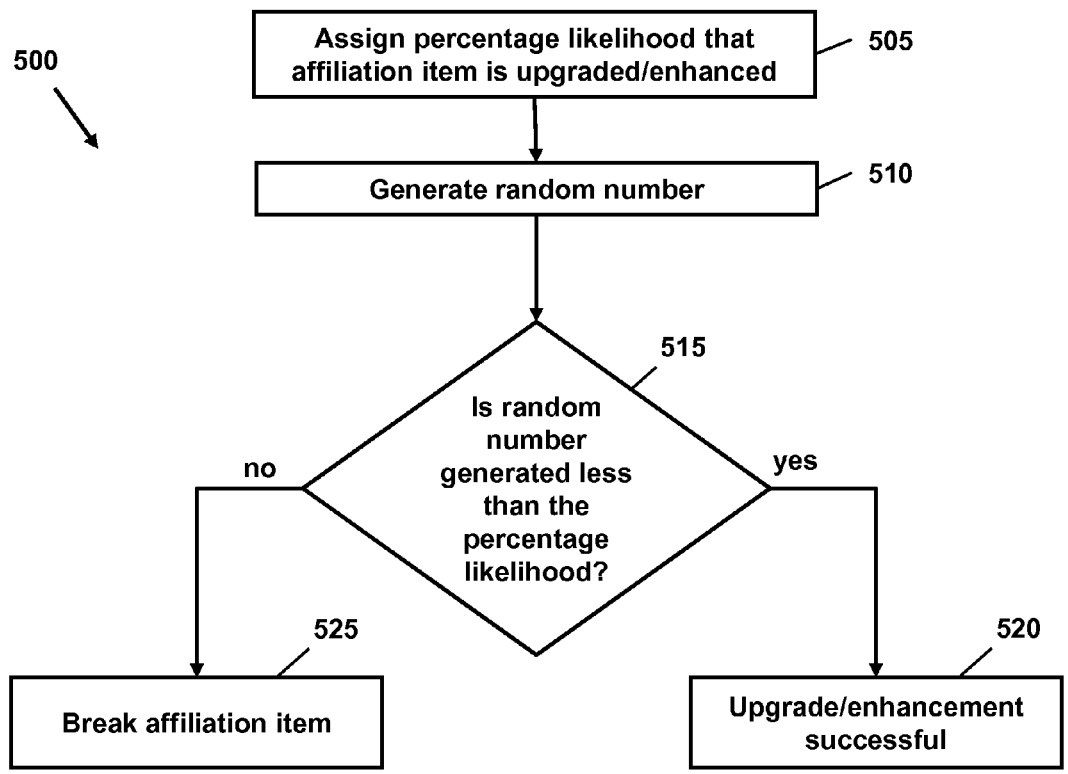
FIG. 5 depicts a method that is used in some embodiments for determining whether the affiliation virtual item is upgraded/enhanced or broken.

FIG. 5 depicts a method 500 that is used in some embodiments for determining whether the affiliation virtual item is upgraded/enhanced or broken. The method may be executed on one or more computer processors, e.g., processor 180. Again, although described together, the method for determining if an item is upgraded may be separate from the method for determining if the item is enhanced. The method 500 begins by assigning at operation 505 a percentage likelihood of the affiliation virtual item being upgraded/enhanced. Then, at operation 510, a random number is generated. Then it is determined at operation 515 if the random number is less than the percentage likelihood of the upgrade/enhancement being successful when all modifiers are taken into account, e.g., increases to the likelihood of success provided by additional virtual items or currency. If the random number is less than the likelihood, the item is upgrade or enhanced as appropriate at operation 520. If the random number is greater than the likelihood, the item is broken (if the additional items were not provided to prevent it from being broken) at operation 525 and the level bonuses and quality bonuses are decreased and/or negated.

As described above, the method 500 may also include optional steps (not shown) where the offer to upgrade/enhance the affiliation virtual item includes a requirement that the user pay an amount of virtual currency to accept the offer and a step where the virtual currency is received. Additionally or alternatively, the offer to upgrade/enhance the affiliation virtual item may also include a step where a second virtual item is received from the user to prevent the first affiliation virtual item from breaking. Additionally or alternatively, the method 500 may also include a step where a second virtual item is received to increase the chance of the affiliation virtual item being upgraded/enhanced.

The method 500 may also allow a user to place a second virtual item in a second slot within the interface, the second virtual item also including a level value and a quality value. If this happens, responsive to the user placing the second virtual item in the second slot, one or more quality-based bonuses are provided based on the quality of the second virtual item and a level-based bonus for each of the quality-based bonuses is provided to the user's in-game persona based on the level value of the second virtual item.

Figure 6:
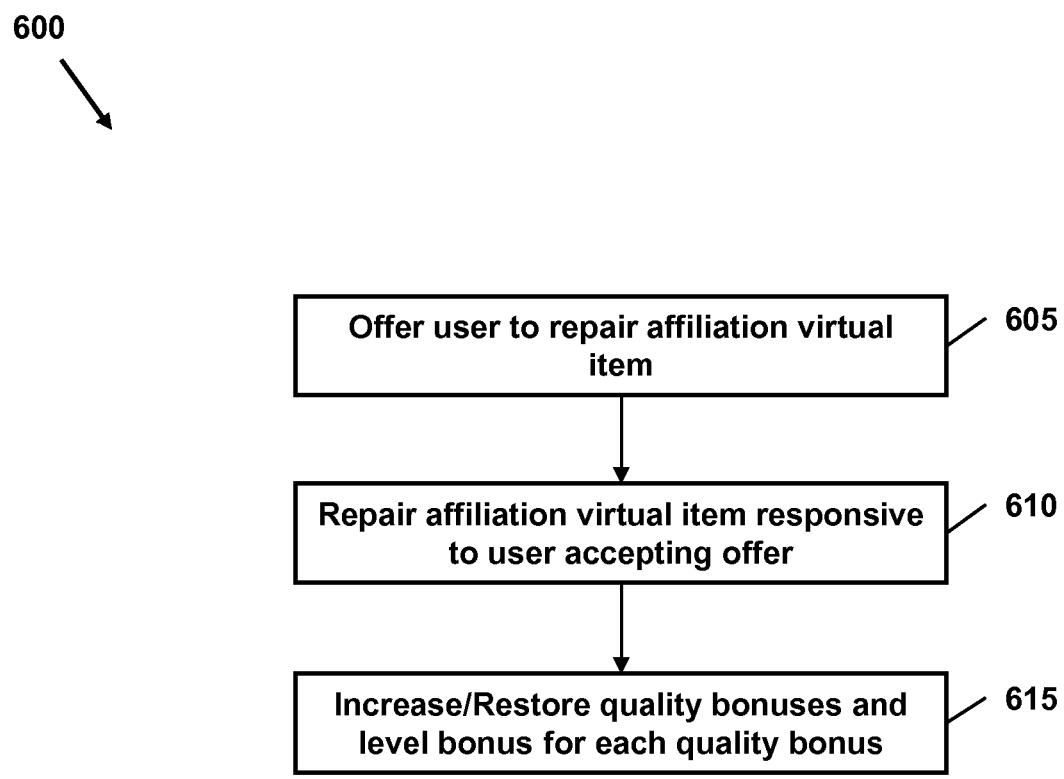
FIG. 6 depicts a method of repairing the virtual item if it is broken.

FIG. 6 depicts a method 600 of repairing the affiliation virtual item if it is broken. The method may be executed on one or more computer processors, e.g., processor 180. As described above, a broken item may have its quality bonuses and level bonuses for each quality bonus decreased, in some versions decreased to the point of being negated. The method 600 begins by offering to the user, at operation 605, the ability to repair the affiliation virtual item if it is broken. The offer to repair the affiliation virtual item may include a requirement that the user pay an amount of virtual currency to accept the offer. Then, at operation 610, the broken item is repaired responsive to an acceptance of the offer to repair the broken item. Then, at operation 615, each of the quality bonuses and the level bonus for each quality bonus are increased and/or restored.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for granting bonuses to a user's in-game persona, the system comprising:
   one or more physical computer processors configured by machine-readable instructions to:
   manage one or more affiliations within a game comprising a discrete group of users with a relationship having a functional significance within the game that has an impact on game play, wherein the affiliations have associated affiliation virtual items that provide a benefit to members of the affiliations, such that the one or more affiliations include a first affiliation having an associated first affiliation virtual item that provides a benefit to members of the first affiliation;
   define an interface that allows a user to place the first affiliation virtual item in a first slot within the interface, the first affiliation virtual item comprising a first level value, wherein the first level value provides an associated first benefit level to the members of the first affiliation;
   receive input by the user to place the first affiliation virtual item in the first slot;
   establish, responsive to reception of the input, a set of one or more level bonuses based on the first level value;
   cause the interface to offer the user the ability to upgrade the first affiliation virtual item;
   determine, responsive to an acceptance of the offer, whether the first virtual item is upgraded or broken;
   increase each of the one or more level bonuses for the first affiliation virtual item responsive to the first affiliation virtual item being upgraded, wherein increasing each of the one or more level bonuses for the first affiliation virtual item increases each of the associated first benefit levels to the members of the first affiliation;
   decrease each of the one or more level bonuses for the first affiliation virtual item responsive to the first affiliation virtual item being broken, wherein decreasing each of the one or more level bonuses for the first affiliation virtual item decreases each of the associated first benefit levels to the members of the first affiliation; and,
   provide each of the one or more level bonuses to the in-game personas of members of the first affiliation.

2. The system of claim 1, wherein the affiliation virtual item comprises a first quality value and the one or more physical computer processors are configured by machine-readable instructions to establish, responsive to reception of the input, a set of one or more quality bonuses based on the first quality value.

3. The system of claim 2, wherein the one or more physical computer processors are configured by machine-readable instructions to establish, responsive to reception of the input, a level bonus for each of the one or more quality bonuses based on the first level value.

4. The system of claim 3, wherein the one or more physical computer processors are configured by machine-readable instructions to increase the level bonus for each of the one or more quality bonuses responsive to the first virtual item being upgraded.

5. The system of claim 1, wherein determining whether the first affiliation virtual item is upgraded or broken requires:
   assigning a percentage likelihood of the first affiliation virtual item being upgraded;
   generating a random number; and, upgrading the first affiliation virtual item responsive to the random number being less than the percentage likelihood of the first affiliation virtual item being upgraded and breaking the first affiliation virtual item responsive to the random number being greater than the percentage likelihood.

6. The system of claim 1, wherein the one or more physical computer processors are configured by machine-readable instructions to provide an offer to enhance the first affiliation virtual item to users, wherein the offer includes a requirement that the user pay an amount of virtual currency to accept the offer.

7. The system of claim 1, wherein the one or more physical processors are configured by machine-readable instructions to provide an option to the user to prevent the first affiliation virtual item from breaking by providing a second virtual item.

8. The system of claim 1, wherein the one or more physical processors are configured by machine-readable instructions to provide an option to the user to increase the chance of the first affiliation virtual item being upgraded by providing a second virtual item.

9. The system of claim 8 wherein the one or more physical processors are configured by machine-readable instructions to:
allow the user to place a second virtual item in a second clot within the interface, the second virtual item comprising a second level value; and,
provide, responsive to the user placing the second virtual item in the second slot, a third bonus based on the second level value.

10. The system of claim 9, wherein the second virtual item comprises a second quality value and the one or more physical processors are configured by machine-readable instructions to:
provide, responsive to the user placing the second virtual item in the second slot, a fourth bonus based on the second quality value.

11. A method for granting bonuses to a user's in-game persona, the method performed using one or more physical computer processors, the method comprising:
managing one or more affiliations within a game comprising a discrete group of users with a relationship having a functional significance within the game that has an impact on game play, wherein the affiliations have associated affiliation virtual items that provide a benefit to members of the affiliations, such that the one or more affiliations include a first affiliation having an associated first affiliation virtual item that provides a benefit to members of the first affiliation;
defining an interface that allows a user to place the first affiliation virtual item in a first slot within the interface, the first affiliation virtual item comprising a first level value, wherein the first level value provides an associated first benefit level to the members of the first affiliation;
receiving input by the user to place the first affiliation virtual item in the first slot;
establishing, responsive to reception of the input, a set of one or more level bonuses based on the first level value;
causing the interface to offer the user the ability to upgrade the first affiliation virtual item;
determining, responsive to an acceptance of the offer, whether the first virtual item is upgraded or broken;

increasing each of the one or more level bonuses for the first affiliation virtual item responsive to the first affiliation virtual item being upgraded, wherein increasing each of the one or more level bonuses for the first affiliation virtual item increases each of the associated first benefit levels to the members of the first affiliation;
decreasing each of the one or more level bonuses for the first affiliation virtual item responsive to the first affiliation virtual item being broken, wherein decreasing each of the one or more level bonuses for the first affiliation virtual item decreases each of the associated first benefit levels to the members of the first affiliation; and,
providing each of the one or more level bonuses to the in-game personas of members of the first affiliation.

12. The method of claim 11, wherein the affiliation virtual item comprises a first quality value and the method further comprises:
establishing responsive to reception of the input, a set of one or more quality bonuses based on the first quality value.

13. The method of claim 12, further comprising establishing, responsive to reception of the input, a level bonus for each of the one or more quality bonuses based on the first level value.

14. The method of claim 13, further comprising increasing the level bonus for each of the one or more quality bonuses responsive to the first virtual item being upgraded.

15. The method of claim 11, wherein determining whether the first affiliation virtual item is upgraded or broken requires:
assigning a percentage likelihood of the first affiliation virtual item being upgraded;
generating a random number; and,
upgrading the first affiliation virtual item responsive to the random number being less than the percentage likelihood of the first affiliation virtual item being upgraded and breaking the first affiliation virtual item responsive to the random number being greater than the percentage likelihood.

16. The method of claim 11, further comprising providing an offer to enhance the first affiliation virtual item to users, wherein the offer includes a requirement that the user pay an amount of virtual currency to accept the offer.

17. The method of claim 11, further comprising providing an option to the user to prevent the first affiliation virtual item from breaking by providing a second virtual item.

18. The method of claim 11, further comprising providing an option to the user to increase the chance of the first affiliation virtual item being upgraded by providing a second virtual item.

19. The method of claim 18, further comprising:
allowing the user to place a second virtual item in a second clot within the interface, the second virtual item comprising a second level value; and,
providing, responsive to the user placing the second virtual item in the second slot, a third bonus based on the second level value.

20. The method of claim 11, wherein the second virtual item comprises a second quality value and the method further comprises:
providing, responsive to the user placing the second virtual item in the second slot, a fourth bonus based on the second quality value.

* * * * *